May 20, 1969
A. T. CHARLTON
3,445,842
SIGNAL LIGHT LENS HAVING TWO PORTIONS
JOINED WITH A MOLDED JOINT
Filed April 3, 1964
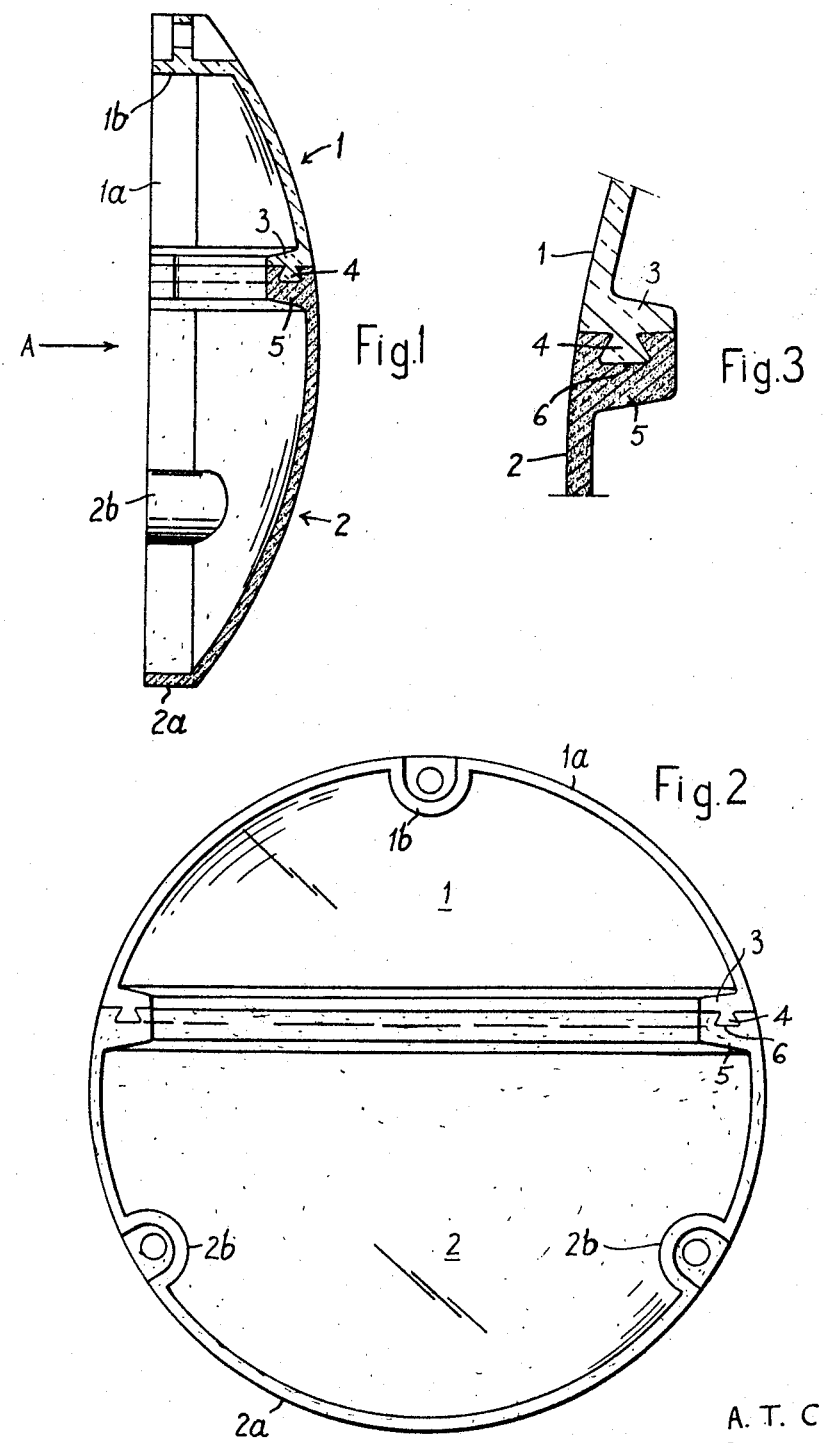
Inventor
A. T. CHARLTON
By
Holcombe, Wetherill & Brisebois
Attorneys United States Patent Office 3,445,842
Patented May 20, 1969

3,445,842
SIGNAL LIGHT LENS HAVING TWO PORTIONS JOINED WITH A MOLDED JOINT
Arthur Thomas Charlton, Osterley, Middlesex, England, assignor to Magnatex Limited, Harlington, England, a British company
Filed Apr. 3, 1964, Ser. No. 357,069
Claims priority, application Great Britain, Apr. 5, 1963, 13,654/63
Int. Cl. B60g 1/26; G02b 5/20
U.S. Cl. 340—383
2 Claims

ABSTRACT OF THE DISCLOSURE

The invention relates to light filters, particularly for motor car lamps which comprise two or more portions having different colours such as red, amber and clear. The filter is made by moulding translucent synthetic plastics materials of the different colours, the portion of lighter colour being first moulded with a dovetail or similar portion along the edge where the darker colour portion is to be joined and then moulding thereto the portion of darker colour thereby to produce a unitary filter of which the join is mechanically strong and watertight.

---

The present invention relates to light filters comprising two or more portions having different colours. On motor cars the lamp lenses are differently coloured, some being red for rear lights, some being amber for direction indicator lights and some being clear. For some vehicles these different lamp lenses are arranged side-by-side. They are often separate and mounted in appropriate framework and in some cases they are stuck together to form a unit.

The present invention has for its object to provide a method of producing such vari-coloured light filters or lamp lenses in a unitary structure, in which the junction between the different portions is well defined and watertight.

According to the invention, the method of manufacturing a multi-coloured light filter comprises making a moulding of the lighter coloured portion from a translucent synthetic plastic material of the desired colour, said moulding being formed along the edge thereof to which another portion of the filter is to be joined with a projecting rib or series of projections, said rib or projections being undercut or formed with openings therein, and in moulding another darker coloured portion of the filter from a translucent synthetic plastic material against said edge of the first portion so that the material of the second portion flows into and interlocks with the undercuts or openings in said rib or projections of the first portion firmly to secure the two portions assembled together.

The invention also consists in a light filter manufactured by this method.

The invention further consists in a light filter comprising at least two differently coloured light filter portions which are permanently joined together, the lighter coloured portion being provided with interlocking means projecting from an edge thereof which is adjacent a darker coloured portion, around which interlocking means the material of the darker coloured portion is moulded.

In a preferred form of the invention, the interlocking means, comprising the rib or each projection, is of dovetail configuration, and to provide adequate strength at the joint whilst maintaining the main portion of the filter relatively thin so as to provide the required light transmission characteristics, the edge of the moulded portion carrying the rib or projections is formed with a flange, and the other portion is moulded with a flange of corresponding depth, thereby providing a reinforcing rib around the zone of the joint. The rib or projections may project either on the inside or the outside of the filter or partly inwardly and partly outwardly.

In order that the invention may be more clearly understood, one embodiment thereof will now be described with reference to the accompanying drawings, in which:

FIGURE 1 is a transverse section through a two-part, moulded, vehicle lamp lens or filter.

FIGURE 2 is a view in the direction of the arrow A in FIGURE 1, and

FIGURE 3 is a fragmentary section, on an enlarged scale, of the joint shown in FIGURE 1.

Referring to the drawings, the vehicle lamp lens or filter comprises a lighter coloured section or portion 1 and a darker coloured moulding or portion 2, both moulded of translucent synthetic plastic material, such as an acrylic resin material known under the registered trademarks "Perspex" or "Diakon." For example, the portion 1 may be clear or opaque and the portion 2 may be amber, to constitute respectively the lenses of the front lamp and direction indicator of an automobile front lamp unit. The portions 1 and 2 are generally part spherical in outline and are provided with integral peripheral flanges 1a, 2a having integral apertured bosses 1b, 2b for receiving mounting screws or the like (not shown) to secure the lens unit to a vehicle body or the base of the lamp unit (not shown).

The portion 1 is moulded with a flange 3 along the edge of both the part spherical portion and the flanges 1a which adjoins the portion 2, on the side surface of which is formed a projecting rib 4 of dovetail shape. The mouded portion 1 is fitted as an insert into a mould for moulding the portion 2, and the latter is injection-moulded from the darker (amber) translucent synthetic plastic material so that the material of the moulding forming the portion 2 embraces the dovetail rib 4. The portion 2 is also formed with a flange 5 of the same depth as, and butting against, the flange 3. The flanges 3 and 5 form a reinforcing rib at the zone of the joint.

The edge surfaces of the flange 3 and the edge surface 6 (FIGURE 3) of the rib 4 may be provided with a small draft to facilitate withdrawal of the portion 1 from its mould, and the edge surface of the flange 5 may also be provided with a draft to facilitate withdrawal of the complete lens from the mould of the second portion 2.

When the material of the portion 2 hardens it shrinks around the dovetail rib 4 to securely lock the two portions 1 and 2 together, and to form a substantially water and air-tight joint therebetween. Moreover, since the outer ends of the rib 4 which extend along the edges of the flange 1a join the central part of the rib 4 at an angle, the two portions 1 and 2 are locked against sliding separational movement longitudinally of the rib 4 should the rib 4 become loose in its recess in the flange 5.

It will be understood that various modifications may be made without departing from the scope of the present invention as defined in the claims. For example, the multi-coloured lens or filter may be moulded in any desired shape, for example it may be convex as shown in the drawings, concave, or rectangular, the rib 4 being correspondingly shaped. The lens or filter may comprise more than two differently coloured portions, at least two of which are joined together as described. The moulding may also be formed with any desired internal or external prismatic or other surface configuration.

In order to avoid possible surface deformities at the face surface of the portion 1 opposite the flange 3, due for example to increased shrinkage at this point, the width of the flange adjacent the outer face of the portion 1 may be reduced, in which case the adjacent part of the portion 2 would extend above the lower end of the flange 3.

The portions 1 and 2 may be amber and red, respectively, instead of clear and amber, and may be moulded to form lenses of the direction indicator and rear lamp respectively of an automobile rear lamp unit or fitting.

I claim:

1. A light filter comprising first and second abutting filter sections, one of which is lighter in color than the other, interlock means projecting from said first section, said interlock means comprising a continuous dove-tailed rib integral with said first section and extending across the joint line between the two sections and being moulded into the material of said second section to lock said section together, said filter likewise comprising a strengthening flange integral with the adjacent edge of each section and extending away from the outer surface of said filter, said rib being integral with the flange of the first section and moulded into the flange of said second section.

2. A lens assembly according to claim 1, wherein adjacent lengths of the rib extending along the joint are disposed at an angle to one another in order to prevent longitudinal sliding separational movement between the rib and the second section.

References Cited

UNITED STATES PATENTS

| | | | |
|---|---|---|---|
| 1,613,841 | 1/1927 | Monson | 340—383 |
| 2,104,230 | 1/1938 | Kess | 340—383 X |
| 2,223,382 | 12/1940 | Morehead | 340—383 X |
| 2,388,297 | 11/1945 | Slaughter | 46—31 X |

JOHN W. CALDWELL, *Primary Examiner.*

H. I. PITTS, *Assistant Examiner.*

U.S. Cl. X.R.

46—31; 340—94